United States Patent
Kwon et al.

(10) Patent No.: US 9,299,989 B2
(45) Date of Patent: *Mar. 29, 2016

(54) CABLE-TYPE SECONDARY BATTERY

(71) Applicant: LG Chem, Ltd., Seoul (KR)

(72) Inventors: Yo-Han Kwon, Daejeon (KR); Hye-Ran Jung, Daejeon (KR); Eun-Kyung Kim, Daejeon (KR); Je-Young Kim, Daejeon (KR); Hyo-Mi Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,401

(22) Filed: Sep. 12, 2014

(65) Prior Publication Data

US 2015/0004453 A1 Jan. 1, 2015

Related U.S. Application Data

(63) Continuation of application No. PCT/KR2014/004043, filed on May 7, 2014.

(30) Foreign Application Priority Data

May 7, 2013 (KR) .......................... 10-2013-0051562
May 7, 2014 (KR) .......................... 10-2014-0054276

(51) Int. Cl.
*H01M 4/78* (2006.01)
*H01M 4/13* (2010.01)
(Continued)

(52) U.S. Cl.
CPC ........ *H01M 4/78* (2013.01); *H01M 4/13* (2013.01); *H01M 4/622* (2013.01); *H01M 4/623* (2013.01);
(Continued)

(58) Field of Classification Search
CPC ....... H01M 4/04; H01M 4/505; H01M 4/525; H01M 4/74; H01M 10/0431; H01M 10/0436; H01M 10/0525; H01M 10/0565; H01M 10/0587; H01M 10/04; H01M 2/1653; H01M 2/1673; H01M 4/13; H01M 4/75; H01M 4/78; H01M 4/62; H01M 4/625; H01M 4/626; H01M 4/661; H01M 4/662; H01M 4/667; H01M 4/668; H01M 4/742; H01M 10/052; H01M 4/622; H01M 4/623; Y02E 60/122
USPC ........................... 429/94, 165, 209, 247, 249
See application file for complete search history.

(56) References Cited

U.S. PATENT DOCUMENTS 3,079,456 A 2/1963 Pawlak
4,522,897 A 6/1985 Walsh
(Continued)

FOREIGN PATENT DOCUMENTS

EP 2822059 A1 1/2015
EP 2846381 A1 3/2015
(Continued)

OTHER PUBLICATIONS

Original Japanese text of JP 2005-038612.*
(Continued)

*Primary Examiner* — Jonathan Jelsma
*Assistant Examiner* — Omar Kekia
(74) *Attorney, Agent, or Firm* — Lerner, David, Littenberg, Krumholz & Mentlik, LLP (57) ABSTRACT

The present disclosure provides a cable-type secondary battery, comprising: an inner electrode; a separation layer surrounding the outer surface of the inner electrode to prevent a short circuit between electrodes; and a sheet-form outer electrode spirally wound to surround the separation layer or the inner electrode.

27 Claims, 5 Drawing Sheets

(51) Int. Cl.
  *H01M 10/04* (2006.01)
  *H01M 10/0525* (2010.01)
  *H01M 10/0565* (2010.01)
  *H01M 10/0567* (2010.01)
  *H01M 10/0569* (2010.01)
  *H01M 4/62* (2006.01)
  *H01M 4/75* (2006.01)
  *H01M 10/0587* (2010.01)
  *H01M 4/74* (2006.01)
  *H01M 10/052* (2010.01)
  *H01M 4/66* (2006.01)

(52) U.S. Cl.
  CPC .............. *H01M 4/625* (2013.01); *H01M 4/626* (2013.01); *H01M 4/662* (2013.01); *H01M 4/667* (2013.01); *H01M 4/668* (2013.01); *H01M 4/742* (2013.01); *H01M 4/75* (2013.01); *H01M 10/0422* (2013.01); *H01M 10/0431* (2013.01); *H01M 10/052* (2013.01); *H01M 10/0525* (2013.01); *H01M 10/0565* (2013.01); *H01M 10/0567* (2013.01); *H01M 10/0569* (2013.01); *H01M 10/0587* (2013.01); *H01M 4/661* (2013.01); *H01M 2220/20* (2013.01); *Y02E 60/122* (2013.01)

(56) References Cited

U.S. PATENT DOCUMENTS

| | | | | |
|---|---|---|---|---|
| 5,008,165 | A * | 4/1991 | Schmode | 429/94 |
| 5,077,153 | A | 12/1991 | Grange-Cossou et al. | |
| 5,478,676 | A | 12/1995 | Turi et al. | |
| 6,165,645 | A | 12/2000 | Nishimura et al. | |
| 6,280,879 | B1 | 8/2001 | Andersen et al. | |
| 6,399,253 | B1 | 6/2002 | Chang et al. | |
| 6,403,263 | B1 | 6/2002 | Roach | |
| 6,723,467 | B2 * | 4/2004 | Yoshida et al. | 429/144 |
| 7,682,740 | B2 | 3/2010 | Yong et al. | |
| 8,895,189 | B2 | 11/2014 | Zhamu et al. | |
| 8,945,752 | B2 | 2/2015 | Kwon et al. | |
| 2001/0053475 | A1 * | 12/2001 | Ying et al. | 429/137 |
| 2003/0215716 | A1 | 11/2003 | Suzuki et al. | |
| 2005/0069774 | A1 | 3/2005 | Miyazaki et al. | |
| 2005/0112461 | A1 | 5/2005 | Amine et al. | |
| 2005/0118508 | A1 | 6/2005 | Yong et al. | |
| 2005/0155216 | A1 | 7/2005 | Cho et al. | |
| 2006/0008702 | A1 * | 1/2006 | Cheon et al. | 429/164 |
| 2006/0110661 | A1 | 5/2006 | Lee et al. | |
| 2006/0199294 | A1 | 9/2006 | Fujikawa et al. | |
| 2007/0207379 | A1 | 9/2007 | Hatta et al. | |
| 2007/0231682 | A1 | 10/2007 | Aoyama et al. | |
| 2008/0032170 | A1 | 2/2008 | Wainright et al. | |
| 2008/0089006 | A1 | 4/2008 | Zhong et al. | |
| 2009/0047575 | A1 | 2/2009 | Abe et al. | |
| 2009/0107746 | A1 | 4/2009 | Horie et al. | |
| 2010/0216016 | A1 | 8/2010 | Seino et al. | |
| 2010/0261065 | A1 * | 10/2010 | Babinec et al. | 429/246 |
| 2010/0273051 | A1 | 10/2010 | Choi et al. | |
| 2010/0273056 | A1 * | 10/2010 | Kanda et al. | 429/223 |
| 2010/0285341 | A1 | 11/2010 | Yun et al. | |
| 2010/0291442 | A1 | 11/2010 | Wang et al. | |
| 2010/0316898 | A1 | 12/2010 | Howard et al. | |
| 2011/0039140 | A1 * | 2/2011 | Miyahisa et al. | 429/94 |
| 2011/0068001 | A1 | 3/2011 | Affinito et al. | |
| 2011/0111277 | A1 | 5/2011 | Bessho et al. | |
| 2011/0223470 | A1 * | 9/2011 | Tomantschger | 429/163 |
| 2012/0009331 | A1 * | 1/2012 | Kwon et al. | 427/58 |
| 2012/0034509 | A1 | 2/2012 | Bae et al. | |
| 2012/0040231 | A1 | 2/2012 | Hagiwara et al. | |
| 2012/0040235 | A1 | 2/2012 | Cho et al. | |
| 2012/0077109 | A1 | 3/2012 | Hong et al. | |
| 2012/0100412 | A1 * | 4/2012 | Kwon et al. | 429/149 |
| 2012/0107658 | A1 | 5/2012 | Kwon et al. | |
| 2012/0115040 | A1 | 5/2012 | Kwon et al. | |
| 2012/0115259 | A1 | 5/2012 | Lee et al. | |
| 2012/0141877 | A1 | 6/2012 | Choi et al. | |
| 2012/0148902 | A1 | 6/2012 | Kwon et al. | |
| 2012/0174386 | A1 | 7/2012 | Katayama et al. | |
| 2012/0189914 | A1 | 7/2012 | Hara et al. | |
| 2012/0295144 | A1 | 11/2012 | Kwon et al. | |
| 2012/0308863 | A1 | 12/2012 | Masumoto et al. | |
| 2013/0011742 | A1 | 1/2013 | Park et al. | |
| 2013/0089774 | A1 | 4/2013 | Chami | |
| 2013/0130107 | A1 | 5/2013 | Uchida | |
| 2013/0143126 | A1 | 6/2013 | Jung et al. | |
| 2013/0288150 | A1 | 10/2013 | Hodges et al. | |
| 2013/0344363 | A1 | 12/2013 | Upadhyaya | |
| 2013/0344368 | A1 | 12/2013 | Kwon et al. | |
| 2014/0011065 | A1 | 1/2014 | Kwon et al. | |
| 2014/0030569 | A1 | 1/2014 | Kwon et al. | |
| 2014/0170454 | A1 | 6/2014 | Kwon et al. | |
| 2014/0178726 | A1 | 6/2014 | Kwon et al. | |
| 2014/0186672 | A1 | 7/2014 | Kwon et al. | |
| 2014/0186673 | A1 | 7/2014 | Kwon et al. | |
| 2014/0212720 | A1 | 7/2014 | Kwon et al. | |
| 2014/0234681 | A1 | 8/2014 | Kwon et al. | |
| 2014/0370351 | A1 | 12/2014 | Kwon et al. | |

FOREIGN PATENT DOCUMENTS

| | | | |
|---|---|---|---|
| JP | H07220759 A | 8/1995 | |
| JP | 11-297360 A | 10/1999 | |
| JP | 2000311693 A | 11/2000 | |
| JP | 2004281156 A | 10/2004 | |
| JP | 2005-038612 | * 10/2005 | ............. H01M 4/70 |
| JP | 2006069559 A | 3/2006 | |
| JP | 2007265989 A | 10/2007 | |
| JP | 2009064767 A | 3/2009 | |
| JP | 2010067524 A | 3/2010 | |
| JP | 2010165471 A | 7/2010 | |
| JP | 2011054502 A | 3/2011 | |
| JP | 2011192620 A | 9/2011 | |
| JP | 2013020410 A | 1/2013 | |
| KR | 20050043674 A | 5/2005 | |
| KR | 20050075811 A | 7/2005 | |
| KR | 10-0582557 B1 | 5/2006 | |
| KR | 2008-0005627 A | 1/2008 | |
| KR | 20080010166 A | 1/2008 | |
| KR | 20080015373 A | 2/2008 | |
| KR | 100918751 B1 | 9/2009 | |
| KR | 20100117403 A | 11/2010 | |
| KR | 20100130818 A | 12/2010 | |
| KR | 20110038038 A | 4/2011 | |
| KR | 20110136448 A | 12/2011 | |
| KR | 20120000708 A | 1/2012 | |
| KR | 20120014542 A | 2/2012 | |
| KR | 20120094871 A | 8/2012 | |
| KR | 2012-0103515 A | 9/2012 | |
| KR | 2013-0040160 A | 4/2013 | |
| KR | 20130040166 A | 4/2013 | |
| KR | 20130045219 A | 5/2013 | |
| WO | WO2005/098994 | * 10/2005 | ............. H01M 2/10 |
| WO | 2005112151 A1 | 11/2005 | |
| WO | 2011159083 A2 | 12/2011 | |
| WO | 2012017546 A1 | 2/2012 | |
| WO | 2012088643 A1 | 7/2012 | |

OTHER PUBLICATIONS

Machine English Translation of JP 2005-038612.*
International Search Report for Application No. PCT/KR2014/004042 dated Sep. 11, 2014.
International Search Report for Application No. PCT/KR2014/004043 dated Sep. 11, 2014.
International Search Report for Application No. PCT/KR2014/004044 dated Oct. 1, 2014.
International Search Report for Application No. PCT/KR2014/004046 dated Oct. 1, 2014.
International Search Report for Application No. PCT/KR2014/004048 dated Sep. 12, 2014.
International Search Report from PCT/KR2014/003737, dated Aug. 14, 2014.

(56) References Cited

OTHER PUBLICATIONS

International Search Report from PCT/KR2014/004047, dated Sep. 3, 2014.
U.S. Appl. No. 14/445,144, filed Jul. 29, 2014.
U.S. Appl. No. 14/472,635, filed Aug. 29, 2014.
U.S. Appl. No. 14/472,692, filed Aug. 29, 2014.
U.S. Appl. No. 14/477,305, filed Sep. 4, 2014.
U.S. Appl. No. 14/477,317, filed Sep. 4, 2014.
U.S. Appl. No. 14/479,713, filed Sep. 8, 2014.
U.S. Appl. No. 14/479,821, filed Sep. 8, 2014.
U.S. Appl. No. 14/479,856, filed Sep. 8, 2014.
U.S. Appl. No. 14/480,914, filed Sep. 9, 2014.
U.S. Appl. No. 14/480,919, filed Sep. 9, 2014.
U.S. Appl. No. 14/480,926, filed Sep. 9, 2014.
U.S. Appl. No. 14/483,318, filed Sep. 11, 2014.
U.S. Appl. No. 14/483,328, filed Sep. 11, 2014.
U.S. Appl. No. 14/483,348, filed Sep. 11, 2014.
U.S. Appl. No. 14/483,373, filed Sep. 11, 2014.
U.S. Appl. No. 14/484,454, filed Sep. 12, 2014.
U.S. Appl. No. 14/484,463, filed Sep. 12, 2014.
U.S. Appl. No. 14/484,472, filed Sep. 12, 2014.
U.S. Appl. No. 141/484,487, filed Sep. 12, 2014.
Y.H. Kwon, S.-W. Woo, H.-R. Jung, H.K. Yu, K. Kim, B.H. Oh, S. Ahn, S.-Y. Lee, S.-Wan Song, J. Cho, H.-C. Shin, J. Y. Kim, Cable-Type Flexible Lithium Ion Battery Based on Hollow Multi-Helix Electrodes, Adv. Mater. 2012, 24, 5192-5197.
International Search Report for Application No. PCT/KR2014/004039 dated Sep. 11, 2014.
Partial European Search Report for Application No. EP14734372 dated Dec. 9, 2015.

* cited by examiner

CABLE-TYPE SECONDARY BATTERY

CROSS-REFERENCE TO RELATED APPLICATION

This application is a continuation of International Application No. PCT/KR2014/004043 filed on May 7, 2014, which claims priority under 35 USC 119(a) to Korean Patent Application No. 10-2013-0051562 filed in the Republic of Korea on May 7, 2013, and Korean Patent Application No. 10-2014-0054276 filed in the Republic of Korea on May 7, 2014, the disclosure of which is incorporated herein by reference.

TECHNICAL FIELD

The present disclosure relates to a cable-type secondary battery which can freely change in shape, and more specifically to a cable-type secondary battery constructed to be prevented from the release of an electrode active material layer and to have improved electrode flexibility.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop cable-type batteries having a very high ratio of length to cross-sectional diameter. The cable-type batteries are easy in shape variation, while being subject to stress due to external force for the shape variation. Also, the electrode active material layer of cable-type batteries may be released by rapid volume expansion during charging and discharging processes. From these reasons, the capacity of the batteries may be reduced and the cycle life characteristics thereof may be deteriorated.

Such a problem may be solved in a certain degree by increasing the amount of a binder used in the electrode active material layer to provide flexibility during bending or twisting. However, the increase of a binder amount in the electrode active material layer causes an electrode resistance rise to deteriorate battery performances. Also, when intense external forces are applied, for example, in the case that electrodes are completely folded, the release of the electrode active material layer cannot be prevented even though the amount of a binder becomes increased. Therefore, this method is insufficient to solve such problems.

SUMMARY OF THE DISCLOSURE

The present disclosure is designed to solve the problems of the related art, and therefore the present disclosure is directed to providing a cable-type battery which can be mitigated from crack generation in an electrode active material layer by external forces, and also can be prevented from the release of the electrode active material layer from a current collector even if severe cracks are present.

In accordance with one aspect of the present disclosure, there is provided a cable-type secondary battery, comprising: an inner electrode; a separation layer surrounding the outer surface of the inner electrode to prevent a short circuit between electrodes; and a sheet-form outer electrode spirally wound to surround the separation layer or the inner electrode.

The separation layer may be laminated on the outer electrode to form an assembly of separation layer-outer electrode, and the assembly of separation layer-outer electrode may be spirally wound to surround the inner electrode.

Meanwhile, the sheet-form outer electrode may be in the form of a uniaxially extended strip.

The sheet-form outer electrode may be spirally wound so that it is not overlapped in its width or overlapped in its width.

The sheet-form outer electrode may comprise an outer current collector and an outer electrode active material layer formed on one surface of the outer current collector.

Also, the sheet-form outer electrode may further comprise a first porous supporting layer formed on the outer electrode active material layer.

In addition, the sheet-form outer electrode may further comprise a porous coating layer formed on the first porous supporting layer and comprising a mixture of inorganic particles and a binder polymer.

Moreover, the sheet-form outer electrode may further comprise a second supporting layer formed on another surface of the outer current collector.

Additionally, the sheet-form outer electrode may further comprise a conductive layer between the outer electrode active material layer and the first supporting layer, the conductive layer comprising a conductive material and a binder.

Meanwhile, the inner electrode may comprise one or more inner current collector and an inner electrode active material layer formed on a surface of the inner current collector.

The inner electrode may be a hollow structure whose central part is empty.

The inner current collector comprised in the inner electrode may be one or more wires being spirally wound, one or more sheets being spirally wound, or two or more wires being spirally crossed with each other.

Also, the inner electrode may be provided with a core of inner current collector, a core for supplying lithium ions, which comprises an electrolyte, or a filling core therein.

The core for supplying lithium ions may further comprise a gel polymer electrolyte and a support, or may further comprise a liquid electrolyte and a porous carrier.

Meanwhile, the inner electrode may have a structure that the inner electrode active material layer is formed on the whole surface of the inner current collector, or a structure that the inner electrode active material layer is formed to surround the outer surface of the inner current collector.

Also, the inner electrode may further comprise a polymer supporting layer formed on a surface of the inner electrode active material layer.

The polymer supporting layer may be a porous layer having a pore size of 0.01 to 10 µm and a porosity of 5 to 95%.

Also, the polymer supporting layer may comprise a linear polymer with polarity, an oxide-based linear polymer or a mixture thereof.

The linear polymer with polarity may be selected from the group consisting of polyacrylonitrile, polyvinyl chloride, polyvinylidene fluoride (PVDF), polyvinylidene fluoride-co-hexafluoro propylene, polyvinylidene fluoride-co-trichloro-ethylene, polyethylene imine, polymethyl methacrylate, polybutyl acrylate, polyvinylpyrrolidone, polyvinylacetate, polyethylene-co-vinyl acetate, polyarylate, poly-p-phenylene terephthalamide and a mixture thereof.

The oxide-based linear polymer may be selected from the group consisting of polyethylene oxide, polypropylene oxide, polyoxymethylene, polydimethylsiloxane and a mixture thereof.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material used in the inner current collector may be selected from the group consisting of polyacetylene, polyaniline, polypyrrole, polythiophene, polysulfurnitride, indium tin oxide (ITO), silver, palladium, nickel and a mixture thereof.

The conductive polymer used in the inner current collector may be selected from the group consisting of polyacetylene, polyaniline, polypyrrole, polythiophene, polysulfurnitride and a mixture thereof.

Meanwhile, the outer current collector may be in the form of a mesh.

Also, at least one of the inner current collector and the outer current collector may further comprise a primer coating layer consisting of a conductive material and a binder.

The outer current collector may have a plurality of recesses on at least one surface thereof.

The plurality of recesses may be continuously patterned or intermittently patterned.

In addition, the outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Meanwhile, the first supporting layer may be a mesh-form porous membrane or a non-woven fabric.

The first supporting layer may be made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

Also, the first supporting layer may further comprise a conductive material-coating layer having a conductive material and a binder on the top surface thereof.

In the conductive material-coating layer, the conductive material and the binder may be present in a weight ratio of 80:20 to 99:1.

Meanwhile, the second supporting layer may be a polymer film which may be made of any one selected from the group consisting of polyolefin, polyester, polyimide, polyamide and a mixture thereof.

The conductive layer may be formed from a mixture of the conductive material and the binder in a weight ratio of 1:10 to 8:10.

Also, the conductive layer may be a porous layer having a pore size of 0.01 to 5 µm and a porosity of 5 to 70%.

The conductive material may comprise any one selected from the group consisting of carbon black, acetylene black, ketjen black, carbon fiber, carbon nanotube, graphene and a mixture thereof.

The binder may be selected from the group consisting of polyvinylidene fluoride (PVDF), polyvinylidene fluoride-co-hexafluoro propylene, polyvinylidene fluoride-co-trichloro-ethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

The electrolyte which is used in the core for supplying lithium ions may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

The electrolyte may further comprise a lithium salt which may be selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

Meanwhile, the inner electrode may be an anode or a cathode, and the outer electrode may be a cathode or an anode corresponding to the inner electrode.

When the inner electrode is an anode and the outer electrode is a cathode, the inner electrode active material may comprise any one selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and the outer electrode active material may comprise any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x<0.5$, $0 \leq y<0.5$, $0 \leq z<0.5$, and $x+y+z \leq 1$), and a mixture thereof.

Alternatively, when the inner electrode is a cathode and the outer electrode is an anode, the inner electrode active material may comprise any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x<0.5$, $0 \leq y<0.5$, $0 \leq z<0.5$, and $x+y+z \leq 1$), and a mixture thereof, and the outer electrode active material may comprise any one selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof.

Meanwhile, the separation layer may be an electrolyte layer or a separator.

The electrolyte layer may comprise an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt, which may be selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The separator may be a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

Further, in accordance with another aspect of the present invention, there is provided a cable-type secondary battery, comprising: a core for supplying lithium ions, which comprise an electrolyte; an inner electrode comprising one or more wire-form inner current collector which is wound to surround the outer surface of the core for supplying lithium ions, and an inner electrode active material layer formed on a surface of the wire-form inner current collector; a separation layer surrounding the outer surface of the inner electrodes to prevent a short circuit between electrodes; and a sheet-form outer electrode surrounding the outer surface of the separation layer, wherein the outer electrode comprises an outer current collector, an outer electrode active material layer formed on one surface of the outer current collector, a conductive layer formed on the outer electrode active material layer and comprising a conductive material and a binder, a first porous supporting layer formed on the conductive layer, and a second supporting layer formed on another surface of the outer current collector.

The outer electrode may be spirally wound to surround the separation layer.

In accordance with still another aspect of the present disclosure, there is provided a cable-type secondary battery, comprising: two or more inner electrodes arranged in parallel to each other; a separation layer surrounding the outer surface of the inner electrodes to prevent a short circuit between electrodes; and a sheet-form outer electrode surrounding the outer surface of the separation layer.

The outer electrode may be spirally wound to surround the separation layer.

In accordance with still another aspect of the present disclosure, there is provided a cable-type secondary battery, comprising: two or more cores for supplying lithium ions, which comprise an electrolyte; two or more inner electrodes arranged in parallel to each other, each inner electrode comprising one or more wire-form inner current collector which is wound to surround the outer surface of each core for supplying lithium ions, and an inner electrode active material layer formed on a surface of the wire-form inner current collector; a separation layer surrounding the outer surface of the inner electrodes to prevent a short circuit between electrodes; and a sheet-form outer electrode surrounding the outer surface of the separation layer, wherein the outer electrode comprises an outer current collector, an outer electrode active material layer formed on one surface of the outer current collector, a conductive layer formed on the outer electrode active material layer and comprising a conductive material and a binder, a first porous supporting layer formed on the conductive layer, and a second supporting layer formed on another surface of the outer current collector.

The outer electrode may be spirally wound to surround the separation layer.

Also, the inner current collector comprised in the inner electrode may be one or more wires being spirally wound, or one or more sheets being spirally wound.

Thus, the cable-type secondary battery of the present disclosure has supporting layers on both surfaces of a sheet-form outer electrode to exhibit surprisingly improved electrode flexibility.

The supporting layers act as a buffer to reduce crack generation in an electrode active material layer even though the amount of a binder in an electrode active material layer is not raised. Thereby, the release of the electrode active material layer from a current collector can be prevented.

From this, battery capacity can be prevented from its decrease and the cycle life characteristic of batteries can be improved.

Also, the cable-type secondary battery of the present disclosure has a conductive layer on the top surface of an outer electrode active material layer to provide an increased conductivity.

Further, the cable-type secondary battery of the present disclosure has a porous supporting layer to allow good introduction of an electrolyte solution in an electrode active material layer, and also the electrolyte solution can be impregnated into the pores of the porous supporting layer to inhibit a resistance rise in the battery, thereby preventing the deterioration of battery performances.

BRIEF DESCRIPTION OF THE DRAWINGS

Other objects and aspects of the present disclosure will become apparent from the following descriptions of the embodiments with reference to the accompanying drawings in which.

EXPLANATION OF REFERENCE NUMERALS 10, 100, 200, 300: Cable-type secondary battery
11, 110, 210, 310: Core for supplying lithium ions
12, 120, 220, 320: Wire-form Inner current collector
13, 130, 230, 330: Inner electrode active material layer
14, 140, 240, 340: Separation layer
15, 151, 351: Outer current collector
16, 152, 352: Outer electrode active material layer
17, 160, 260, 360: Protection coating
20: Cable-type secondary battery
21: Inner electrode
24: Separation layer
25: Outer electrode
150, 250, 350: Outer electrode
153, 253, 353: Conductive layer
154, 254, 354: First supporting layer
155, 255, 355: Second supporting layer

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
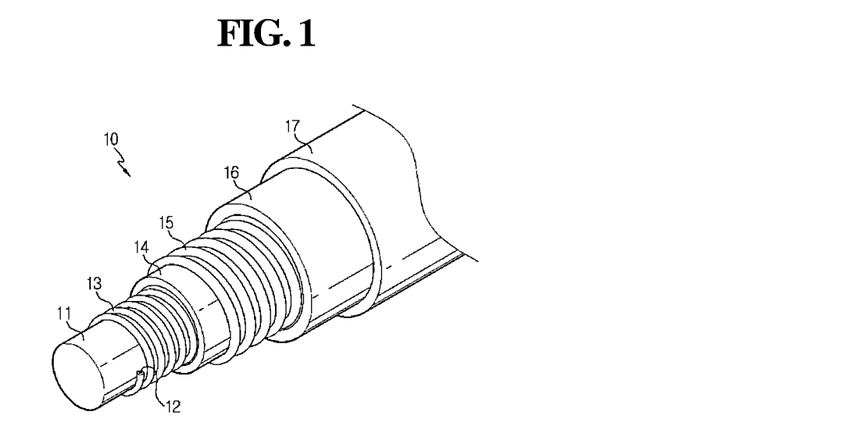
FIG. 1 is a perspective view schematically showing a cable-type secondary battery having a wire-form outer current collector according to a comparative example of the present disclosure.

FIG. 1 shows a cable-type secondary battery having a wire-form outer current collector according to a comparative example of the present disclosure and FIGS. 2 to 5 schematically show a sheet-form outer electrode and a cable-type secondary battery having the sheet-form outer electrode in accordance with one embodiment of the present disclosure.

Referring to FIGS. 1 to 5, a cable-type secondary battery 10 according to a comparative example of the present disclosure has a wound wire-form outer current collector 15 and an outer electrode active material layer 16 formed by way of dip coating to surround the outer surface of the outer current collector. The outer current collector 15 which is configured in the form of a wire provides poor electron transfer during the charge and discharge of the battery, as compared with a sheet-form current collector, because a linear resistance is greater than a sheet resistance in the wire form. As a result, the internal resistance of the battery is raised, thereby deteriorating the rate characteristic of the battery and leading to the poor life characteristic of the battery even under the high rate conditions.

Also, the outer electrode active material layer 16 may be cracked on the surface thereof, even though the outer electrode active material layer is protected from its shape change by a protection coating under external bending or twisting conditions as it is formed by a dip coating method. The generation of cracks may adversely affect electrode flexibility.

In order to solve this problem, the cable-type secondary battery of the present disclosure is configured to have a sheet-form outer electrode surrounding the outer surface of the separation layer and formed by being spirally wound.

Figure 2:
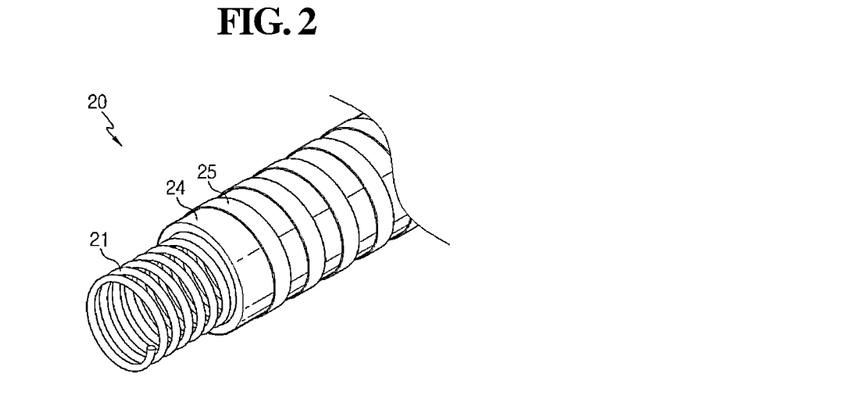
FIG. 2 is a perspective view schematically showing a cable-type secondary battery having a sheet-form outer current collector according to one embodiment of the present disclosure.

That is, a cable-type secondary battery 20 according to one aspect of the present disclosure comprises an inner electrode 21; a separation layer 24 surrounding the outer surface of the inner electrode 21 to prevent a short circuit between electrodes; and a sheet-form outer electrode 25 surrounding the separation layer 24 or the inner electrode 21 and formed by being spirally wound.

The separation layer 24 may be formed by surrounding the outer surface of the inner electrode 21 completely.

Also, although not shown in the drawings, the outer electrode may be disposed in the ouster side of the separation layer and may be spirally wound to surround the separation layer or the inner electrode completely.

Furthermore, the separation layer may be laminated on the outer electrode to form an assembly of separation layer-outer electrode, and the assembly of separation layer-outer electrode may be spirally wound to surround the inner electrode.

The term 'spirally' used herein refers to represent a helix shape that turns around at a certain area while moving, including general spring forms.

In the present disclosure, the outer electrode may comprise an outer current collector and an outer electrode active material layer formed on one surface of the outer current collector.

From this, in the assembly of separation layer-outer electrode of the cable-type secondary battery according to one embodiment of the present disclosure, the separation layer may come into contact with the outer electrode active material layer or the outer current collector.

The assembly of separation layer-outer electrode may be integrated by adhesion, for example the assembly of separation layer-outer electrode may be formed by adhering and integrating the separation layer and the outer electrode through a lamination process by way of roll press.

As will be described below, the sheet-form outer electrode 25 may further comprise a first supporting layer formed on the outer surface thereof and a second supporting layer formed on another surface thereof, thereby solving crack occurrence on the surface of an outer electrode active material layer.

The sheet-form outer electrode may be in the form of a uniaxially extended strip.

Also, the sheet-form outer electrode 25 may be spirally wound so that it is not overlapped in its width or overlapped in its width. For example, in order to prevent the deterioration of battery performances, the sheet-form outer electrode 25 may be spirally wound with space within the double length of its width so that it is not overlapped.

Alternatively, the sheet-form outer electrode 25 may be spirally wound while overlapping in its width. In this case, in order to inhibit an excessive resistance rise within the battery, the sheet-form outer electrode 25 may be spirally wound so that the width of its overlapped part may be within 0.9 folds of the width of the sheet-form outer electrode 25 itself.

The sheet-form outer electrode may comprise an outer current collector and an outer electrode active material layer formed on one surface of the outer current collector.

Also, the sheet-form outer electrode may further comprise a first porous supporting layer formed on the outer electrode active material layer.

In addition, the sheet-form outer electrode may further comprise a conductive material coating layer comprising a conductive material and a binder on the first porous supporting layer, and also may further comprise a porous coating layer comprising a mixture of inorganic particles and a binder polymer on the first porous supporting layer.

In the porous coating layer formed from inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer, In such a porous coating layer, the inorganic particles are filled in contact with each other, from which interstitial volumes are formed between the inorganic particles. The interstitial volumes between the inorganic particles become empty spaces to form pores.

Meanwhile, the sheet-form outer electrode may further comprise a second supporting layer formed on another surface of the outer current collector.

Also, the sheet-form outer electrode may further comprise a conductive layer between the outer electrode active material layer and the first supporting layer and comprising a conductive material and a binder.

Meanwhile, the inner electrode may comprise one or more inner current collector and an inner electrode active material layer formed on a surface of the inner current collector.

The inner electrode may be a hollow structure whose central part is empty.

The inner current collector comprised in the inner electrode may be one or more wires being spirally wound or one or more sheets being spirally wound.

Alternatively, the inner current collector may be two or more wires being spirally crossed with each other.

Also, the inner electrode may be provided with a core of inner current collector therein.

The core of inner current collector may be made of carbon nanotube, stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer.

Alternatively, the inner electrode may be provided with a core for supplying lithium ions, which comprises an electrolyte therein.

The core for supplying lithium ions may comprise a gel polymer electrolyte and a support.

Also, the core for supplying lithium ions may comprise a liquid electrolyte and a porous carrier.

Alternatively, the inner electrode may be provided with a filling core therein.

The filling core may be made of several materials for improving various performances of cable-type batteries, for example polymer resins, rubber and inorganics, besides materials forming the core of inner current collector and the core for supplying lithium ions, and also may have various forms including wire, fiber, powder, mesh and foam.

Figure 3:
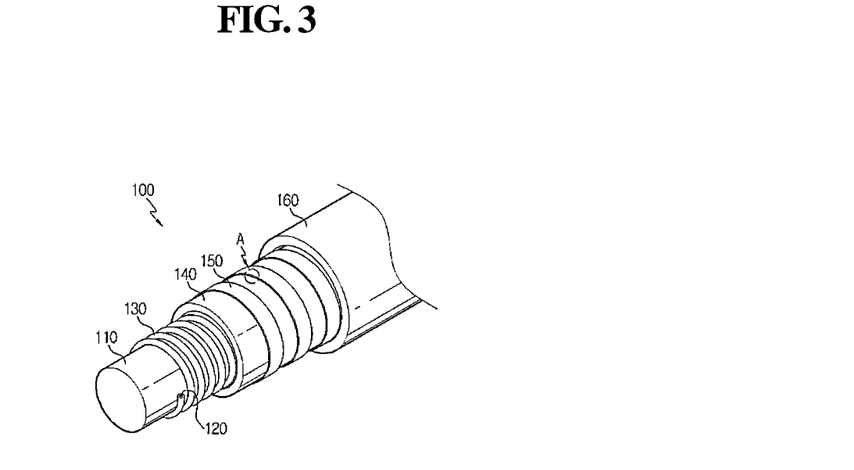
FIG. 3 is a perspective view schematically showing a cable-type secondary battery having a sheet-form outer current collector according to another embodiment of the present disclosure.
Figure 5:
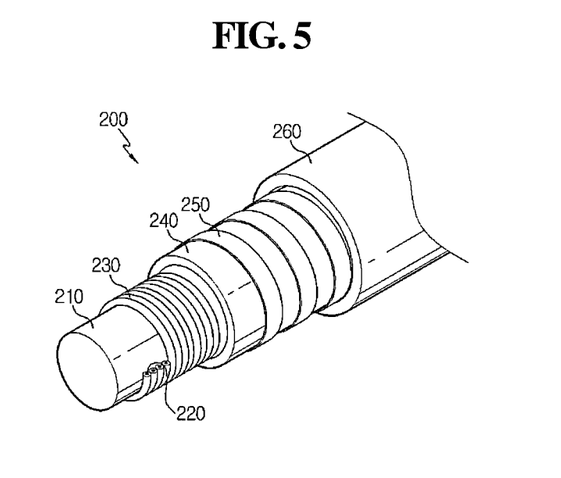
FIG. 5 is a perspective view schematically showing a cable-type secondary battery having a sheet-form outer current collector according to another embodiment of the present disclosure.

Meanwhile, a cable-type secondary battery 100, 200 according to one embodiment of the present disclosure comprises a core 110, 210 for supplying lithium ions, which comprises an electrolyte; an inner electrode, comprising one or more wire-form inner current collector 120, 220 which is wound to surround the outer surface of the core 110, 210 for supplying lithium ions, and an inner electrode active material layer 130, 230 formed on a surface of the wire-form inner current collector 120, 220; a separation layer 140, 240 surrounding the outer surface of the inner electrode to prevent a short circuit between electrodes; and a sheet-form outer electrode 150, 250 surrounding the outer surface of the separation layer 140, 240, wherein the outer electrode 150, 250 comprises an outer current collector 151, an outer electrode active material layer 152 formed on one surface of the outer current collector 151, a conductive layer 153 formed on the outer electrode active material layer 152 and comprising a conductive material and a binder, a first porous supporting layer 154 formed on the conductive layer 153, and a second supporting layer 155 formed on another surface of the outer current collector 151.

The outer electrode may be spirally wound to surround the separation layer.

The cable-type secondary battery of the present disclosure has a horizontal cross section of a predetermined shape, a linear structure, which extends in the longitudinal direction, and flexibility, so it can freely change in shape. The term 'a predetermined shape' used herein is not limited to any particular shape, and refers to any shape that does not damage the nature of the present disclosure.

The inner electrode may have a structure that the inner electrode active material layer is formed on the whole surface of the inner current collector, or a structure that the inner electrode active material layer is formed to surround the outer surface of the inner current collector.

For the structure that the inner electrode active material layer is formed on the whole surface of a wire-form inner current collector, in the case shown in FIG. 3, the inner electrode active material layer 130 may be formed on a surface of one wire-form inner current collector 120 before the wire-form inner current collector 120 is wound on the outer surface of the core 110 for supplying lithium ions, and in the case shown in FIG. 5, the inner electrode active material layer 230 may be formed on a surface of two or more wire-form inner current collectors 220 and then two or more wire-form inner current collectors 220 may be together wound while crossing with each other, which is favorable in the improvement of battery rate characteristics.

For structure that the inner electrode active material layer is formed to surround the outer surface of a wound wire-form inner current collector, a inner current collector may be wound on the outer surface of a core for supplying lithium ions, and then an inner electrode active material layer is formed to surround the outer surface of the wound wire-form inner current collector.

Also, the inner electrode may further comprise a polymer supporting layer formed on a surface of the inner electrode active material layer.

In the case that the inner electrode active material layer further comprises a polymer supporting layer on a surface thereof, in accordance with one embodiment of the present disclosure, although the inner electrode is in the form of a wound wire, it is possible to prevent crack occurrence even when the cable-type secondary battery is bent by external force. Thereby, the release of the inner electrode active material layer can be prevented to minimize the deterioration of battery performances. Furthermore, the polymer supporting layer may have a porous structure which allows good introduction of an electrolyte solution in the inner electrode active material layer, thereby preventing an electrode resistance rise.

In the present disclosure, the polymer supporting layer may comprise a linear polymer with polarity, an oxide-based linear polymer or a mixture thereof.

The linear polymer with polarity may be selected from the group consisting of polyacrylonitrile, polyvinyl chloride, polyvinylidene fluoride (PVDF), polyvinylidene fluoride-co-hexafluoro propylene, polyvinylidene fluoride-co-trichloro-ethylene, polyethylene imine, polymethyl methacrylate, polybutyl acrylate, polyvinylpyrrolidone, polyvinylacetate, polyethylene-co-vinyl acetate, polyarylate, poly-p-phenylene terephthalamide and a mixture thereof.

The oxide-based linear polymer may be selected from the group consisting of polyethylene oxide, polypropylene oxide, polyoxymethylene, polydimethylsiloxane and a mixture thereof.

Also, the polymer supporting layer may be a porous layer having a pore size of 0.01 to 10 μm and a porosity of 5 to 95%.

Such a porous structure of the polymer supporting layer may be formed by phase separation or phase change using a non-solvent during its preparation.

For example, polyvinylidene fluoride-co-hexafluoro propylene as a polymer is added to acetone used as a solvent to obtain a solution having 10 wt % of solids. To the solution obtained, water or ethanol as a non-solvent is added in an amount of 2 to 10 wt % to form phase-separated parts of the non-solvent and the polymer. Among these, the parts of the non-solvent become pores. Accordingly, the size of pores can be controlled depending on the solubility of the non-solvent and the polymer and the amount of the non-solvent.

Meanwhile, the wire-form inner current collector 120, 220 is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

As mentioned above, when secondary batteries are subject to external forces by bending or twisting, an electrode active material layer may be released from a current collector. For this reason, large amounts of binder components are used in the electrode active material layer so as to provide flexibility in electrodes. However, large amounts of binder may be easily peeled off owing to swelling by an electrolyte solution, thereby deteriorating battery performances.

Accordingly, for the purpose of improving adhesiveness between an electrode active material layer and a current collector, the inner current collector 120, 220 or the outer current collector 151 may further comprise a primer coating layer consisting of a conductive material and a binder. The conductive material and the binder used in the primer coating layer may be the same as those used in the formation of the conductive layer, which will be described below.

Figure 6:
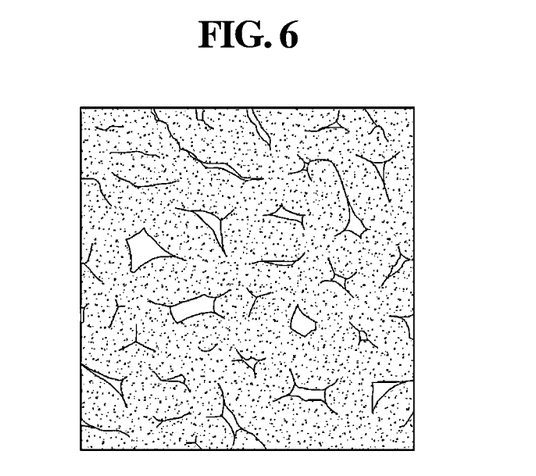
FIG. 6 shows a surface of a mesh-form current collector according to one embodiment of the present disclosure.
Figure 7:
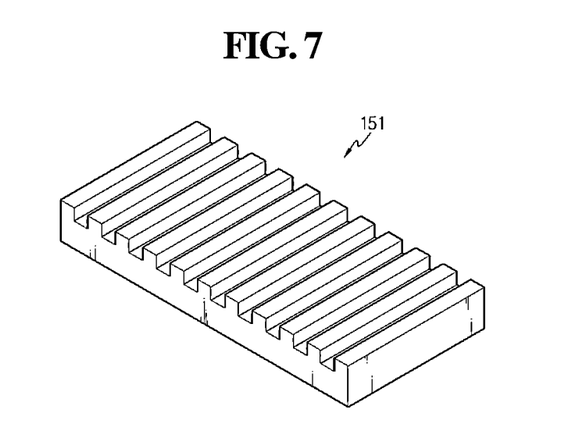
FIG. 7 schematically shows a surface of a current collector having a plurality of recesses, according to one embodiment of the present disclosure.
Figure 8:
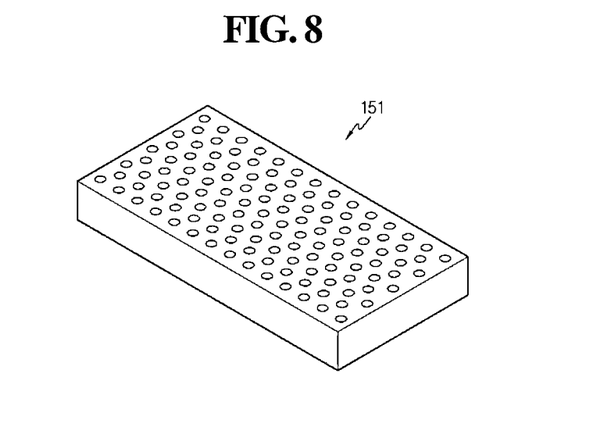
FIG. 8 schematically shows a surface of a current collector having a plurality of recesses, according to another embodiment of the present disclosure.

Further, referring to FIGS. 6 to 8, the outer current collector 151 may be in the form of a mesh, and may have a plurality of recesses on at least one surface thereof so as to more increase its surface area. The recesses may be continuously patterned or intermittently patterned. That is, continuous patterned recesses may be formed with spacing apart with each other in the longitudinal direction, or a plurality of holes may be formed in the form of intermittent patterns. The plurality of holes may be a circular or polygonal shape. Furthermore, the inner current collector 120, 220 may have a plurality of recesses, similar to the outer current collector 151.

Figure 4:
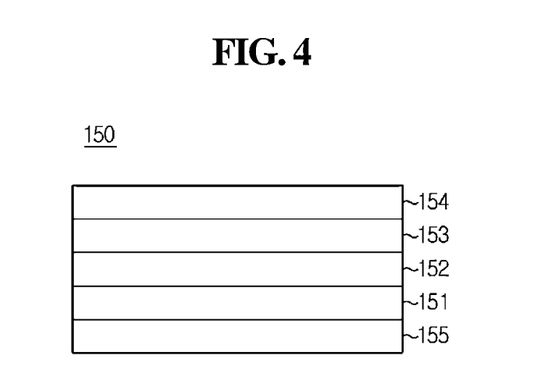
FIG. 4 is a schematic view showing a cross-section of a sheet-form outer current collector according to one embodiment of the present disclosure.

Such an outer current collector 151 may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; a conductive polymer; a metal paste comprising metal powders of Ni, Al, Au, Ag, Pd/Ag, Cr, Ta, Cu, Ba or ITO; or a carbon paste comprising carbon powders of graphite, carbon black or carbon nanotube.

Meanwhile, the first supporting layer 154 may be a mesh-form porous membrane or a non-woven fabric. Such a porous structure allows good introduction of an electrolyte solution in the outer electrode active material layer 152, and also the first supporting layer 154 itself has superior impregnation of the electrolyte solution to provide good ionic conductivity, thereby preventing an electrode resistance rise and eventually preventing the deterioration of battery performances.

The first supporting layer 154 may be made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

Also, the first supporting layer 154 may further comprise a conductive material-coating layer having a conductive material and a binder on the top surface thereof. The conductive material-coating layer functions to improve the conductivity of an electrode active material layer and reduce electrode resistance, thereby preventing the deterioration of battery performances.

The conductive material and the binder used in the conductive material-coating layer may be the same as those used in the formation of the conductive layer, which will be described below.

Such conductive material-coating layer is more favorable when applied in a cathode because a cathode active material layer has low conductivity to intensify performance deterioration due to electrode resistance rise, than in an anode whose active material layer has relatively good conductivity even in the absence of the conductive material-coating layer to exhibit performances similar to conventional anodes.

In the conductive material-coating layer, the conductive material and the binder may be present in a weight ratio of 80:20 to 99:1. The use of large amounts of binder may induce a severe rise in electrode resistance. Therefore, when such a numerical range is satisfied, electrode resistance can be prevented from its severe rise. Also, as mentioned above, since the first supporting layer acts as a buffer which can prevent the release of an electrode active material layer, electrode flexibility is not largely affected by the use of the binder in a relative small amount.

Meanwhile, the second supporting layer 155 may be a polymer film which may be made of any one selected from the group consisting of polyolefin, polyester, polyimide, polyamide and a mixture thereof.

The conductive layer 153 may be formed from a mixture of the conductive material and the binder in a weight ratio of 1:10 to 8:10.

Also, the conductive layer 155 may have a porous structure for good introduction of an electrolyte solution in an electrode active material layer, and have a pore size of 0.01 to 5 μm and a porosity of 5 to 70%.

The conductive material used in the conductive layer may comprise any one selected from the group consisting of carbon black, acetylene black, ketjen black, carbon fiber, carbon nanotube, graphene and a mixture thereof.

The binder used in the conductive layer may be selected from the group consisting of polyvinylidene fluoride (PVDF), polyvinylidene fluoride-co-hexafluoro propylene, polyvinylidene fluoride-co-trichloroethylene, polybutyl acrylate, polymethyl ethacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

Meanwhile, the core 110, 210 for supplying lithium ions comprises an electrolyte which is not particularly limited to its kinds and may be selected from a non-aqueous electrolyte solution using ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA) or methyl propionate (MP); a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc). Also, the electrolyte may further comprise a lithium salt which may be selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenylborate, and a mixture thereof. The core 110, 210 for supplying lithium ions may consist of only an electrolyte, and especially a liquid electrolyte may be formed by using a porous carrier.

In the present disclosure, the inner electrode may be an anode or a cathode, and the outer electrode may be a cathode or an anode corresponding to the inner electrode.

The electrode active material layers of the present disclosure allow ions to move through the current collector, and the movement of ions is caused by the interaction of ions such as intercalation/deintercalation of ions into and from the electrolyte layer.

Such electrode active material layers may be divided into an anode active material layer and a cathode active material layer.

Specifically, when the inner electrode is an anode and the outer electrode is a cathode, the inner electrode active material layer may comprise an anode active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and the outer electrode active material layer may comprise a cathode active material selected from the group consisting of LiCoO$_2$, LiNiO$_2$, LiMn$_2$O$_4$, LiCoPO$_4$, LiFePO$_4$, LiNiMnCoO$_2$, LiNi$_{1-x-y-z}$Co$_x$M1$_y$M2$_z$O$_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer becomes a cathode active material layer and the outer electrode active material layer becomes an anode active material layer.

An electrode active material layer generally comprises an electrode active material, a binder and a conductive material and is combined with a current collector to construct an electrode. When the electrode is subject to deformation, e.g., folding or severe bending by external forces, the electrode active material layer is released, thereby deteriorating battery performances and battery capacity. In contrast, in an electrode comprising the wound sheet-form outer current collector of the present disclosure, such a deformation is less induced because the sheet-form outer current collector being spirally wound has elasticity to disperse the external forces applied in the electrode. From this, the release of an active material can be prevented.

In the present disclosure, the separation layer may be an electrolyte layer or a separator.

The electrolyte layer serving as an ion channel may be made of a gel-type polymer electrolyte using PEO, PVdF, PVdF-HFP, PMMA, PAN or PVAC, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a support to improve poor mechanical properties, and the support may be a porous-structured support or a cross-linked polymer. The electrolyte layer of the present invention can serve as a separator, and thus an additional separator may be omitted.

In the present disclosure, the electrolyte layer may further comprise a lithium salt. The lithium salt can improve an ionic conductivity and response time. Non-limiting examples of the lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous polymer substrate made of a polyolefin-based polymer selected from the group consisting of ethylene homopolymers, propylene homopolymers, ethylene-butene copolymers, ethylene-hexene copolymers, and ethylene-methacrylate copolymers; a porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates; a porous substrate made of a mixture of inorganic particles and a binder polymer; or a separator having a porous coating layer formed on at least one surface of the porous polymer substrate and comprising inorganic particles and a binder polymer.

In the porous coating layer formed from inorganic particles and a binder polymer, the inorganic particles are bound to each other by the binder polymer (i.e., the binder polymer connects and immobilizes the inorganic particles), and also the porous coating layer maintains the state of binding with the first supporting layer by the binder polymer, In such a porous coating layer, the inorganic particles are filled in contact with each other, from which interstitial volumes are formed between the inorganic particles. The interstitial volumes between the inorganic particles become empty spaces to form pores.

Among these, in order for the lithium ions of the core for supplying lithium ions to be transferred to the outer electrode, it is preferred to use a non-woven fabric separator corresponding to the porous polymer substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalates.

Also, the cable-type secondary battery of the present disclosure has a protection coating 160, 260. The protection coating acts as an insulator and is formed to surround the outer current collector, thereby protecting the electrodes against moisture in the air and external impacts. The protection coating 160, 260 may be made of conventional polymer resins having a moisture-blocking layer. The moisture-blocking layer may be made of aluminum or a liquid-crystalline polymer which have good water-blocking ability, and the polymer resins may be PET, PVC, HDPE or epoxy resins.

Hereinafter, the preparation of a cable-type secondary battery according to one embodiment of the present invention will be briefly explained with reference to FIGS. 3 and 9.

First, a wire-form inner current collector 120 having an inner electrode active material layer 130 formed on a surface thereof is wound to obtain a hollow inner electrode whose central part is empty.

The formation of inner electrode active material layer 130 on a surface of the wire-form inner current collector 120 may be made by conventional coating methods, for example, by an electroplating process or an anodic oxidation process. Also, in order to maintain constant intervals, it is preferable to carry out coating methods in which an electrode slurry containing an active material is applied through a comma coater or a slot die coater. In addition, the electrode slurry containing an active material may be applied by way of dip coating or extrusion-coating using an extruder.

Subsequently, a sheet-form separation layer 130 for preventing a short circuit between electrodes is wound on a surface of the inner electrode.

Next, an outer electrode is obtained in the form of a sheet by the following procedures.

Specifically, a sheet-form outer current collector is provided and a second supporting layer is formed by compression on one surface of the sheet-form outer current collector (S1); a slurry containing an outer electrode active material is applied on another surface of the sheet-form outer current collector, followed by drying, to form an outer electrode active material layer (S2); a slurry containing a conductive material and a binder is applied on the outer electrode active material layer, and then a first porous supporting layer is placed thereon (S3); the resultant obtained in step (S3) is compressed to form a conductive layer which is adhered between the outer electrode active material layer and the first porous supporting layer to be integrated with each other, thereby obtaining an outer electrode in the form of a sheet.

Figure 9:
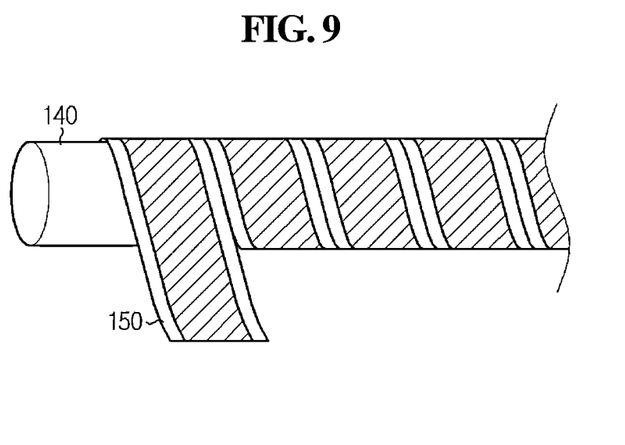
FIG. 9 schematically shows a sheet-form outer electrode being wound on the outer surface of a separation layer.

Then, the sheet-form outer electrode 150 is spirally wound on the outer surface of the separation layer 140 to obtain an electrode assembly, as shown in FIG. 9.

Next, a protection coating 160 is formed to surround the outer surface of the electrode assembly.

The protection coating 160 acting as an insulator is formed on the outermost so as to protect the electrode against moisture in the air and external impact. The protection coating 160 may be made of a polymer resin having a moisture-blocking layer as mentioned above.

Then, an electrolyte is introduced in the empty space formed in the center of the inner electrode, to form a core 110 for supplying lithium ions.

Thus, the core 110 for supplying lithium ions may be formed by carrying out the introduction of an electrolyte solution after the protection coating 160 is formed on the outer surface of the electrode assembly. Also, the core 110 may be formed in a wire form by introducing a polymer electrolyte using an extruder before forming the wound wire-form inner electrode, may be formed by providing a wire-form carrier made of a sponge material and introducing a non-aqueous electrolyte solution therein, or may be formed by introducing a non-aqueous electrolyte solution in the empty space of the inner electrode center after providing the inner electrode.

Finally, the introduction part of the electrolyte solution is completely sealed to prepare a cable-type secondary battery.

Hereinafter, another embodiment of the present disclosure will be described.

A cable-type secondary battery according to another embodiment of the present disclosure comprises an inner electrode; a separation layer surrounding the outer surface of the inner electrode to prevent a short circuit between electrodes; and a sheet-form outer electrode surrounding the outer surface of the separation layer and formed by being spirally wound.

Figure 10:
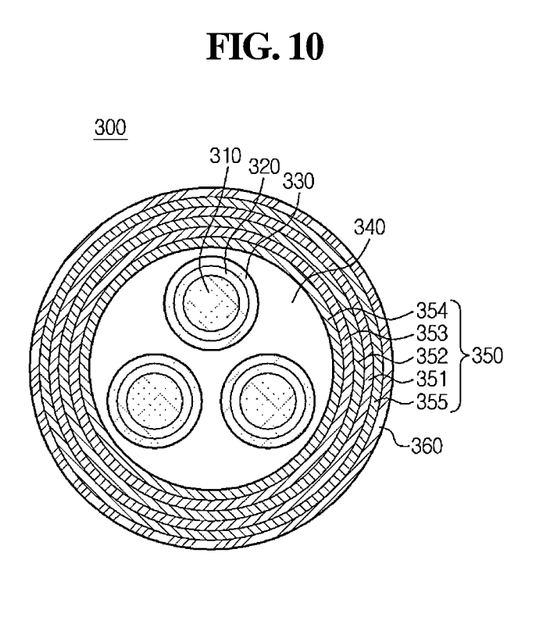
FIG. 10 shows a cross-section of a cable-type secondary battery having two or more inner electrodes according to the present disclosure.

Furthermore, referring to FIG. 10, a cable-type secondary battery 300 according to one embodiment of the present invention comprises two or more cores 310 for supplying lithium ions, which comprise an electrolyte; two or more inner electrodes arranged in parallel to each other, each inner electrode comprising one or more wire-form inner current collector 320 which is wound to surround the outer surface of each core 310 for supplying lithium ions, and an inner electrode active material layer 330 formed on a surface of the wire-form inner current collector 320; a separation layer 340 surrounding the outer surface of the inner electrodes to prevent a short circuit between electrodes; and an outer electrode surrounding the outer surface of the separation layer, wherein the outer electrode 350 is in the form of a sheet which comprises an outer current collector 351, an outer electrode active material layer 352 formed on one surface of the outer current collector 351, a conductive layer 353 formed on the outer electrode active material layer 352 and comprising a conductive material and a binder, a first porous supporting layer 354 formed on the conductive layer 353, and a second supporting layer 355 formed on another surface of the outer current collector 351.

The outer electrode may be spirally wound to surround the separation layer.

In the cable-type secondary battery 300 which has a plurality of inner electrodes, the number of the inner electrodes can be adjusted to control the loading amount of the electrode active material layers as well as battery capacity, and a probability of short circuit can be prevented owing to the presence of multiple electrodes.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

75 wt % of Graphite as an anode active material, 5 wt % of Denka black as a conductive material and 25 wt % of PVdF as a binder were mixed to obtain an anode active material-containing slurry. The slurry was coated on the outer surface of a wire-form Cu current collector having a diameter of 250 μm, to obtain a wire-form inner electrode having an anode active material layer.

Four wire-form inner electrodes obtained above were spirally wound so that they are crossed with each other, to prepare a spring-type inner electrode whose center is empty, so a core for supplying lithium ions can be inserted therein.

Then, a separator sheet was wound to surround the outer surface of the inner electrode to form a separation layer.

Meanwhile, a sheet of aluminum foil was used as a current collector, and a polyethylene film was compressed on one surface of the sheet, to form a second supporting layer.

Next, another surface of the sheet was coated with a cathode active material-containing slurry obtained by dispersing 80 wt % of $LiCoO_2$ as a cathode active material, 5 wt % of Denka black as a conductive material and 15 wt % of PVdF as a binder in NMP used as a solvent, followed by drying, to form a cathode active material layer.

Subsequently, a conductive material-containing slurry obtained by mixing Denka black and PVdF in a weight ratio of 40:60 was coated on the top of the cathode active material layer, and then a PET non-woven fabric to be a first supporting layer was placed on the coating, followed by compression, to obtain a laminate having the second supporting layer, the current collector, the cathode active material layer, a layer of the conductive material-containing slurry and the first supporting layer in order. The laminate obtained after compression was cut into a piece having a width of 2 mm, to prepare a sheet-form cathode for secondary batteries.

Then, the sheet-form cathode was spirally wound on the outer surface of the separation layer, to prepare an electrode assembly.

On the outer surface of the electrode assembly, a heat-shrinkable tube having a moisture-blocking layer was applied and contracted with heat, to form a protection coating layer.

Then, a non-aqueous electrolyte solution (1M $LiPF_6$, EC:PC:DEC=1:1:1 (volume ratio)) was introduced in the center of the inner electrode using a syringe, to form a core for supplying lithium ions, followed by completely sealing. Thereby, a cable-type secondary battery was prepared.

Example 2

The procedures of Example 1 were repeated except that a mixture of PVdF-HFP (5%) in 10:90 (wt/wt) was coated on the inner electrode to further form a polymer supporting layer, thereby preparing a cable-type secondary battery.

Comparative Example

The procedures of Example 1 were repeated except that a wire-form Al current collector was wound on the outer surface of the separation layer, and the outer surface of the wound wire-form current collector was coated with a cathode active material-containing slurry obtained by dispersing 80 wt % of $LiCoO_2$ as a cathode active material, 5 wt % of Denka black as a conductive material and 15 wt % of PVdF as a binder in NMP used as a solvent, followed by drying, to form a cathode active material layer, thereby preparing a cable-type secondary battery.

Evaluation of Battery Performances

For the cable-type secondary batteries prepared in Example 1 and the Comparative Example, 100 cycles of charge/discharge processes were carried out with a current density of 0.3C at a voltage condition of 4.2 to 2.5 V. The change of battery capacity was measured with the current density being varied, and the results thereof are shown in FIGS. 11 and 12.

Figure 11:
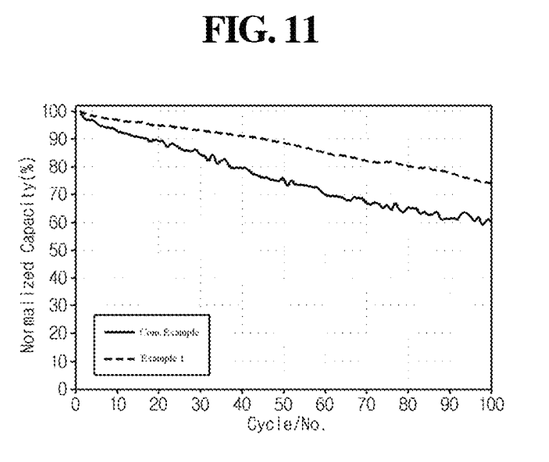
FIG. 11 is a graph showing the cycle life characteristics of cable-type secondary batteries prepared in the Example and the Comparative Example of the present disclosure.
Figure 12:
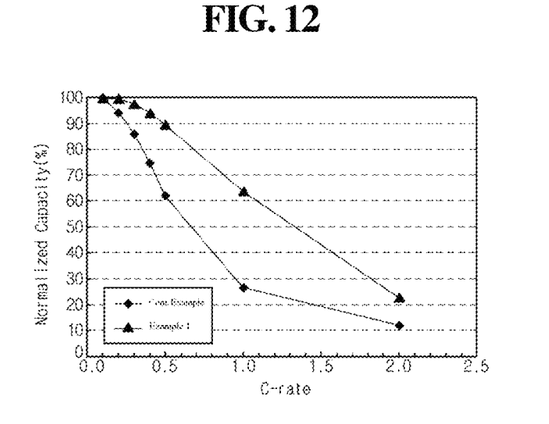
FIG. 12 is a graph showing a capacity change to current density of cable-type secondary batteries prepared in the Example and the Comparative Example of the present disclosure.

As shown in FIGS. 11 and 12, the battery of Example 1 exhibited surprisingly improved cycle characteristic and rate characteristic due to its advantage in terms of resistance, as compared with that of the Comparative Example.

Bending Test for Evaluating Battery Flexibility

In order to confirm the flexibility of the cable-type secondary battery prepared in Example 1, the battery was fixed between grips of a tensile tester, and then the procedure of bending and spreading the battery was repeated with varying a distance between the grips in the range of from 1 to 6 cm at a speed of 500 mm/min. In this procedure, in order to confirm a substantial flexibility of the battery, both ends of the battery were each connected with (+) and (−) terminals of a charge and discharge regulator and discharging was carried out with a current density of 0.1 C.

Figure 13:
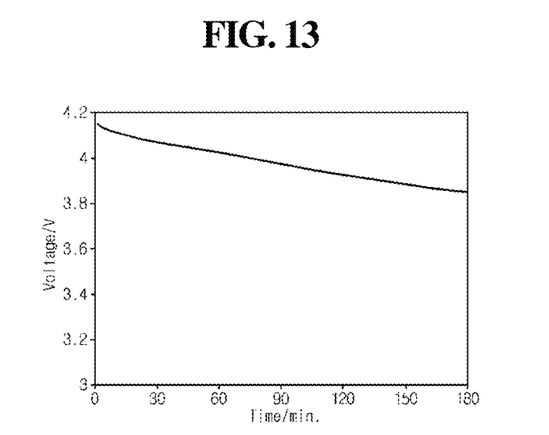
FIG. 13 is a graph showing the discharge profile change under severe bending conditions of a cable-type secondary battery prepared in the Example of the present disclosure.

FIG. 13 shows a discharge profile over time, which from the battery of Example 1 was confirmed to exhibit stable performances as time passed.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A cable-type secondary battery, comprising:
   an inner electrode;
   a separation layer surrounding an outer surface of the inner electrode to prevent a short circuit between electrodes; and
   a sheet-form outer electrode helically wound to surround the separation layer, wherein the sheet-form outer electrode is helically wound so that it does not overlap itself.

2. The cable-type secondary battery according to claim 1, wherein the sheet-form outer electrode is in the form of a uniaxially extended strip.

3. The cable-type secondary battery according to claim 1, wherein the sheet-form outer electrode is helically wound so that each pass of its helical winding is separated by a space.

4. The cable-type secondary battery according to claim 1, wherein the sheet-form outer electrode comprises an outer current collector, an outer electrode active material layer formed on one surface of the outer current collector, and a supporting layer formed on another surface of the outer current collector.

5. The cable-type secondary battery according to claim 1, wherein the sheet-form outer electrode comprises an outer current collector in the form of a mesh and an outer electrode active material layer formed on one surface of the outer current collector.

6. The cable-type secondary battery according to claim 1, wherein the outer electrode comprises an outer current collector, an outer electrode active material layer formed on one surface of the outer current collector, and a first porous supporting layer formed on the outer electrode active material layer.

7. The cable-type secondary battery according to claim 6, wherein the first supporting layer is a mesh-form porous membrane or a non-woven fabric.

8. The cable-type secondary battery according to claim 6, wherein the first supporting layer is made of any one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalate, and a mixture thereof.

9. The cable-type secondary battery according to claim 6, wherein the outer electrode further comprises a conductive material coating layer comprising a conductive material and a binder on the first porous supporting layer.

10. The cable-type secondary battery according to claim 9, wherein the conductive material comprises any one selected from the group consisting of carbon black, acetylene black, ketjen black, carbon fiber, carbon nanotube, graphene and a mixture thereof.

11. The cable-type secondary battery according to claim 9, wherein the binder is selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

12. The cable-type secondary battery according to claim 9, wherein the conductive material and the binder are present in a weight ratio of 80:20 to 99:1 in the conductive material-coating layer.

13. The cable-type secondary battery according to claim 6, wherein the outer electrode further comprises a porous coating layer formed on the first porous supporting layer and comprising a mixture of inorganic particles and a binder polymer.

14. The cable-type secondary battery according to claim 6, wherein the outer electrode further comprises a second supporting layer formed on another surface of the outer current collector.

15. The cable-type secondary battery according to claim 14, wherein the second supporting layer is a polymer film.

16. The cable-type secondary battery according to claim 15, wherein the polymer film is made of any one selected from the group consisting of polyolefin, polyester, polyimide, polyamide and a mixture thereof.

17. The cable-type secondary battery according to claim 6, wherein the outer electrode further comprises a conductive layer between the outer electrode active material layer and the first supporting layer, the conductive layer comprising a conductive material and a binder.

18. The cable-type secondary battery according to claim 17, wherein the conductive layer is formed from a mixture of the conductive material and the binder in a weight ratio of 1:10 to 8:10.

19. The cable-type secondary battery according to claim 17, wherein the conductive layer has a pore size of 0.01 to 5 µm and a porosity of 5 to 70%.

20. The cable-type secondary battery according to claim 17, wherein the conductive material comprises any one selected from the group consisting of carbon black, acetylene black, ketjen black, carbon fiber, carbon nanotube, graphene and a mixture thereof.

21. The cable-type secondary battery according to claim 17, wherein the binder is selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, polyimide and a mixture thereof.

22. The cable-type secondary battery according to claim 4, wherein the outer current collector further comprises a primer coating layer consisting of a conductive material and a binder.

23. The cable-type secondary battery according to claim 1, wherein the inner electrode is an anode or a cathode, and the outer electrode is a cathode or an anode corresponding to the inner electrode.

24. The cable-type secondary battery according to claim 1, wherein when the inner electrode is an anode and the outer electrode is a cathode,
the inner electrode active material comprises any one selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof, and
the outer electrode active material comprises any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

25. The cable-type secondary battery according to claim 1, wherein when the inner electrode is a cathode and the outer electrode is an anode,
the inner electrode active material comprises any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof, and
the outer electrode active material comprises any one selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; an oxide (MeOx) of the metals; a complex of the metals and carbon; and a mixture thereof.

26. The cable-type secondary battery according to claim 1, wherein the separation layer is laminated on the outer electrode to form a sheet-form laminate of separation layer-outer electrode, and the laminate of separation layer-outer electrode is helically wound to surround the inner electrode.

27. A cable-type secondary battery, comprising:
two or more inner electrodes arranged in parallel to each other;
a separation layer surrounding outer surfaces of the two or more inner electrodes to prevent a short circuit between electrodes; and
a sheet-form outer electrode helically wound to surround the separation layer, wherein the sheet-form outer electrode is helically wound so that it does not overlap itself.

* * * * *